United States Patent
Oukassi et al.

(10) Patent No.: US 11,005,277 B2
(45) Date of Patent: May 11, 2021

(54) ELECTRICAL ENERGY STORAGE DEVICE CAPABLE OF BEING RECHARGED UNDER A FIRST VOLTAGE AND OF RECOVERING ITS ENERGY UNDER A SECOND VOLTAGE

(71) Applicant: COMMISSARIAT A L'ENERGIE ATOMIQUE ET AUX ENERGIES ALTERNATIVES, Paris (FR)

(72) Inventors: Sami Oukassi, Saint Egreve (FR); Nicolas Dunoyer, Quaix en Chartreuse (FR); Ghislain Despesse, Voreppe (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 37 days.

(21) Appl. No.: 16/477,516

(22) PCT Filed: Jan. 11, 2018

(86) PCT No.: PCT/EP2018/050681
§ 371 (c)(1),
(2) Date: Jul. 11, 2019

(87) PCT Pub. No.: WO2018/130619
PCT Pub. Date: Jul. 19, 2018

(65) Prior Publication Data
US 2020/0212686 A1    Jul. 2, 2020

(30) Foreign Application Priority Data
Jan. 12, 2017 (FR) ...................... 1750270

(51) Int. Cl.
*H02J 7/00* (2006.01)
*H01M 10/42* (2006.01)
*H01M 10/46* (2006.01)

(52) U.S. Cl.
CPC ......... *H02J 7/0024* (2013.01); *H01M 10/425* (2013.01); *H01M 10/46* (2013.01);
(Continued)

(58) Field of Classification Search
CPC ................ H02J 7/0024; H02J 2207/20; H02J 2207/4271; H01M 10/425; H01M 10/46;
(Continued)

(56) References Cited

U.S. PATENT DOCUMENTS 5,581,454 A * 12/1996 Collins .............. H02M 3/07
                                                    363/59
6,100,665 A    8/2000 Alderman
(Continued)

FOREIGN PATENT DOCUMENTS

EP    2 669 988 A1    12/2013

OTHER PUBLICATIONS

Sukumar, et al., "Switch array system for thin film lithium microbatteries", Journal of Power Sources 136, pp. 401-407, 2004.

*Primary Examiner* — M Baye Diao
(74) *Attorney, Agent, or Firm* — BakerHostetler (57) ABSTRACT

The invention relates to an energy storage device including at least one block having n energy storage units, where n≥2; a charge and discharge management circuit electrically linked to the n storage units and making it possible to alternately connect all of the energy storage units of one and the same block to one another; and the block having a defined block voltage between the low potential of the first energy storage unit and the high potential of the nth energy storage unit. The charge and discharge management circuit includes: first means for triggering the toggling from a parallel mode to a series mode and second means for triggering the toggling from the series mode to the parallel mode.

17 Claims, 9 Drawing Sheets

(52) U.S. Cl.
CPC .............. *H01M 2010/4271* (2013.01); *H01M 2220/30* (2013.01); *H01M 2300/0068* (2013.01); *H02J 2207/20* (2020.01)

(58) Field of Classification Search
CPC ..... H01M 2010/4271; H01M 2220/30; H01M 2300/0068; Y02E 60/10; H02M 3/18
USPC ........................................................ 320/117
See application file for complete search history.

(56) References Cited

U.S. PATENT DOCUMENTS

| | | | |
|---|---|---|---|
| 6,307,350 B1 | 10/2001 | Alderman | |
| 7,268,517 B2 | 9/2007 | Rahmel et al. | |
| 8,350,519 B2* | 1/2013 | Brantner | H02J 7/0032 |
| | | | 320/101 |
| 8,664,920 B2 | 3/2014 | Celani et al. | |
| 9,325,202 B2* | 4/2016 | Yokoyama | H02J 7/35 |
| 9,397,370 B2* | 7/2016 | Nebrigic | H01M 10/44 |
| 9,748,852 B2* | 8/2017 | Freeman | H02M 1/36 |
| 2009/0079385 A1 | 3/2009 | Xiao et al. | |
| 2017/0250551 A1* | 8/2017 | April | H02J 7/0068 |

* cited by examiner

ELECTRICAL ENERGY STORAGE DEVICE CAPABLE OF BEING RECHARGED UNDER A FIRST VOLTAGE AND OF RECOVERING ITS ENERGY UNDER A SECOND VOLTAGE

CROSS-REFERENCE TO RELATED APPLICATIONS

This application is a National Stage of International patent application PCT/EP2018/050681, filed on Jan. 11, 2018, which claims priority to foreign French patent application No. FR 1750270, filed on Jan. 12, 2017, the disclosures of which are incorporated by reference in their entirety.

FIELD OF THE INVENTION

The field of the invention is that of energy storage management circuits.

BACKGROUND

The storage elements may be for example capacitors, supercapacitors, batteries or microbatteries.

Microbatteries are defined as being completely solid electrochemical generators formed by an active stack of thin layers that form the (positive and negative) electrodes separated by an electrolyte. The management circuit provides the functions of charging and discharging the microbatteries, respectively so as to store the available energy and to deliver it for one or more applications under consideration.

The rise of the IoT ("Internet of Things") and WSN ("wireless sensor networks") has been accompanied by an increased requirement for autonomous microsystems that, to this end, incorporate energy recovery and storage components. In this context, the interface between the recovery portion and storage of the energy is of great importance. Specifically, in the case of autonomous microsystems, and in particular those implementing ambient energy recovery (indoor/outdoor solar, thermal, vibratory or even electromagnetic), this often involves energy sources that are highly heterogeneous in terms of electrical specifications. For example, the available power and the voltage vary considerably depending on the type of source. Moreover, energy storage systems also have electrical specifications that vary depending on the components that are used. The interface between said two portions is often formed of an assembly that includes an energy management circuit whose role is to transfer the recovered energy to storage points, and transmit the stored energy to application points with maximum efficiency.

Table 1 below lists a certain number of sources and their specific features.

TABLE 1

| Source | Conversion principle | Typical voltage | Typical power |
|---|---|---|---|
| Solar | Photovoltaic micropanel | 0.5 V per cell | Up to 15 mW/cell |
| Mechanical | Piezoelectric device | 10 VAC Open circuit | Tens of mV |
| Mechanical | Magnetic device | A few volts | Average range |
| RF | Rectenna (antenna + rectification and filtering) | <1 V | Hundreds of µW to a few mW |
| Thermal | Thermoelectric generator | 0.2 mV/K per cell | Hundreds of µW to a few mW |

There are two possible approaches for energy management:
- a first approach involves a management circuit dedicated to a single energy source, which has an optimal configuration for an input under consideration that has only very few variations;
- a second approach involves a configurable management circuit, able to be used for several (or all) energy sources, which may be adapted depending on the available inputs.

Dedicated Management Circuits:

Document U.S. Pat. No. 8,664,920 B2 (2014) describes a dedicated energy management circuit for a photovoltaic (PV) energy source. The architecture of the circuit takes into account the specifications of the given source and the possible range of variation, thereby making it possible to have an optimized efficiency of the transfer of the recovered energy to the storage units. This approach has the drawback of not being very versatile in that the efficiency drops significantly if the specifications of the energy source are modified, for example from a PV recovery to a vibratory recovery (change, inter alia, from a few hundred mV to a few volts). Therefore, several dedicated management circuits are necessary to be able to efficiently recover several types of energy, or then use configurable management circuits.

Configurable Circuits:

Document U.S. Pat. No. 7,268,517 B2 (2007) describes an architecture of a configurable energy management circuit that has the following elements:
- a matrix system of batteries;
- charge/discharge control microswitches;
- a control unit (energy input and SOC for "state of charge") for the batteries.

In this case, the management circuit makes it possible to be able to recover energy from various sources (solar, electromagnetic, mechanical, acoustic, etc.) and to exhibit versatility in comparison with dedicated systems. However, several drawbacks characterize the described circuit, notably the energy supply to the control and configuration portion, thereby limiting the overall efficiency of the proposed system.

In the case of configurable circuits, the prior art close to the present patent application has described, in the article entitled "Switch array system for thin film lithium microbatteries", published in the *Journal of Power Sources* 136 (2004) 401-407, a matrix system for charging and discharging microbatteries implementing a microswitch system. The drawback of this solution (in comparison with the solution of the present invention) is the use of an external control system whose role is to allow the user to control the (series/parallel) connections of the various microbatteries depending on the input and the output. This part requires an electric power supply in order to operate, either from an external source or through a portion of the energy stored by the system, thus reducing the overall energy efficiency of the assembly, and above all that requires at least one of the storage elements to have a voltage high enough to operate ($\geq 3.3$ V).

"Heat pump" solutions, based on switched capacitors such as the reference MAX684 from Maxim, have also already been proposed.

Figure 1A:
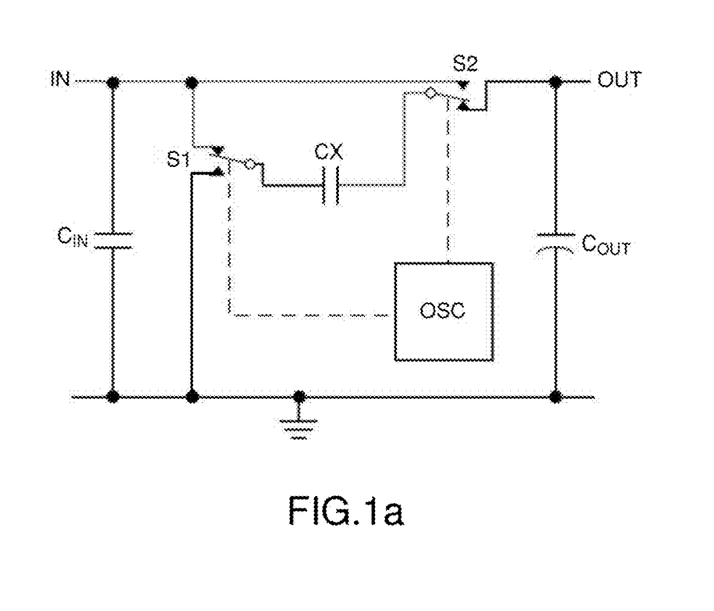
FIGS. 1a and 1b illustrate charge pump examples according to the known art.

FIG. 1a illustrates the operation of the charge pump circuit: the capacitor Cx is first of all charged from the input IN and then placed in series with the input IN and connected to the output. There is then around twice the input voltage IN at the output OUT. The operation may be open-loop: there is high-frequency toggling between the series and parallel modes. The reference MAX684 makes it possible for example to set the frequency between 50 kHz and 2 MHz.

Figure 1B:
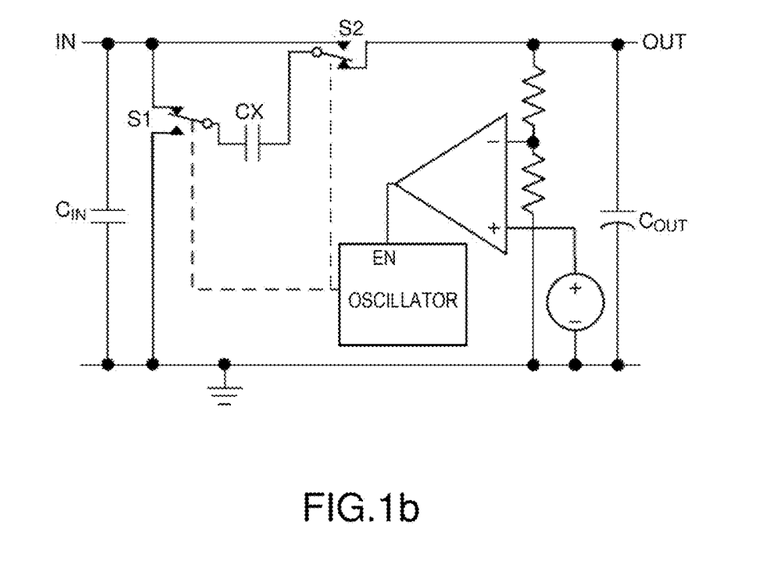

The operation may also be closed-loop, as illustrated in FIG. 1b: the output voltage is regulated to a setpoint voltage via automatic adjustment of the switching frequency (output current that increases with frequency).

It is noted in these two cases that the driving is not linked to the state of charge of the storage element Cx. At each switching operation, it is considered that the transfer time for the energy is virtually zero with regard to the period of the series/parallel toggling operations. This is normal, since it is considered that the source placed at input is not really limited in terms of current with regard to the charge to be injected into the storage element, and that the storage element is capacitive and that it is not itself really limited in terms of current. Lastly, the storage element Cx is not a high-value storage element, and is not intended to provide for the autonomy of the system. Specifically, the requirement to switch at more than 50 kHz means that the storage capacitor Cx provides an autonomy of just 20 µs at most, which is relatively far from the storage requirements of an autonomous device, for example for energy recovery, for which at least a second, or even an hour or a day is targeted.

In the context of the present invention, it is sought notably to develop storage elements greater than 10 µAh, ideally greater than 100 or 1000 µAh, thereby requiring their state to be controlled, especially if they are recharged with a relatively high-impedance source (>10Ω) as may be encountered in energy recovery.

It is then possible to contemplate two toggling conditions:
a first one that does not authorize the placement in series unless the storage elements are correctly recharged to the desired voltage and
a second one that does not authorize the change to parallel mode unless the storage elements have discharged to a second desired voltage.

It should be noted that this involves the voltage of the storage elements, and not the voltage of the source or the output voltage. If it is proposed to regulate the current or the input impedance using several switching blocks, this is performed while respecting at least the two above conditions.

In contrast to charge pumps on the market, which aim essentially to supply an output voltage with consideration to the virtually infinite input power, the Applicant has sought a solution;
that is able to integrate a limited-power source that will take a certain time to recharge the storage element, the storage element being able to serve notably as an energy buffer between a moderate-power and potentially intermittent input source, and power requirements at output that may be different and with far higher peaks;
and the aim of which is to allow storage elements to be recharged while dispensing with an external charge manager.

SUMMARY OF THE INVENTION

To this end, the present invention is based on the idea that a low-voltage source (typically for example less than 2 V) may be connected directly (possibly by way of switches) to storage elements adapted to be recharged at this voltage level. The end of charge management is no longer embodied simply by a recharging cutoff device, but by toggling to a series mode that makes the energy available at a voltage level able to be utilized by an electronic circuit.

The Applicant thus proposes an energy storage device having an energy management circuit or charge and discharge management circuit that is particularly suitable for storing energy from a low-voltage energy source (for example less than 2 V) and for releasing it at a higher voltage (for example 3 V).

One case of application relates to relatively low-power (<1 watt) and low-voltage (<2 V) energy recovery systems, for example radiofrequency energy recuperators, thermal energy recuperators, mechanical energy recuperators based for example on primary energy/electrical energy transduction principles of thermoelectric, photovoltaic and electromagnetic type.

More precisely, one subject of the present invention is an energy storage device comprising at least one block, said block being connected to an input voltage $V_{in}$ and delivering a voltage $V_{out}$ greater than $V_{in}$ and including:
n energy storage units, where n≥2;
a charge and discharge management circuit electrically linked to the n storage units and making it possible to alternately connect all of the energy storage units of one and the same block to one another, in parallel mode or in series mode;
the energy storage units respectively having an end of charge voltage $V_{end\ of\ charge}$ and an end of discharge voltage $V_{end\ of\ discharge}$;
said block having a defined block voltage $V_{Block}$ between the low potential of the first energy storage unit and the high potential of the nth energy storage unit,
wherein said charge and discharge management circuit includes:
first means for triggering the toggling from the parallel mode to the series mode, through the exceedance of a first threshold voltage ($V_{threshold1}$) in one of the energy storage units, said first threshold voltage corresponding to a target end of charge voltage of said storage unit;
second means for triggering the toggling from the series mode to the parallel mode, by the voltage $V_{Block}$ crossing below a second threshold voltage ($V_{threshold2}$), said second threshold voltage corresponding to a voltage equal to the sum of the n end of discharge voltages of the n energy storage units;
said first means and said second means comprising a comparator block comprising at least one comparator electrically linked to the terminals of one of the storage units or to the terminals of the block:
the detection of the crossing by the first threshold voltage being performed by way of a reference voltage and of said comparator block and
the detection of the crossing by the second threshold voltage being performed by way of a reference voltage and of said comparator block.

According to variants of the invention, the comparator block includes two comparators.

The voltage $V_{Block}$ thus corresponds to the potential difference between the first storage unit and the last storage unit when they are in series, and therefore at the end of charge.

It should be noted that the first threshold voltage corresponding to a target end of charge voltage of an energy storage unit may be equal to 100% of the end of charge voltage of this energy storage unit, and it may very well also be equal to 80% or even less of the end of charge voltage of this energy storage unit, this being predetermined.

The same applies with regard to the target discharge voltages.

According to variants of the invention, the device furthermore includes a comparator electrically linked to the terminals of one of the storage units or to the terminals of the block in which the detection of the crossing by the first threshold voltage or by the second threshold voltage is performed by way of a reference voltage and of said comparator.

According to variants of the invention, the device furthermore includes a commandable switch electrically linked to the terminals of one of the storage units or to the terminals of the block in which the detection of the crossing by the first threshold voltage or by the second threshold voltage is performed by way of a toggle threshold voltage of said electronically commandable switch (transistor, relay, microswitch).

According to variants of the invention, said block including n storage units, where n is an integer greater than or equal to 2, the low potential of the ith storage unit (i ranging from 2 to n) is connected to the high potential of the (i−1)th storage unit by way of a first switch and to the low potential of the first storage unit by way of a second switch, and the high potential of the (i−1)th storage unit is connected to the high potential of the nth storage unit via a third switch.

According to variants of the invention, the second and the third switches are in the on state by default so as to allow the storage units to be placed in parallel, for example consisting of transistors that are closed by default or of relays or microswitches that are closed when their control voltage is low or zero.

According to variants of the invention, the minimum control voltages of the second and third switches are less than the first threshold voltage, advantageously at least 2 times less.

According to variants of the invention, the storage units are recharged through an input $V_{in}$ connected to the high potential of the first storage unit, either directly or by way of a one-way current component (diode, current limiter).

According to variants of the invention, the storage units are discharged essentially through an output $V_{out}$ connected to the high potential of the nth storage unit by way of a one-way current component, for example a diode or a matched voltage regulator.

According to variants of the invention, at least one block includes a one-way current component for avoiding the return of current $V_{out}$ to the storage units when these are in parallel mode.

According to variants of the invention, the device includes several switchable blocks advantageously having the same input voltage $V_{in}$ and the same output voltage $V_{out}$.

According to variants of the invention, the device includes at least three blocks, so as to have at least one block in charge mode, at least one block in discharge mode and at least one block in transition mode, in which the first means and the second means are currently toggling.

The transition mode still exists, it is just more or less rapid.

According to variants of the invention, at least one block includes a one-way current component, this block being in parallel charge mode, at least one other block connected in parallel maintaining an output voltage $V_{OUT}$ in discharge mode.

According to variants of the invention, the device comprises means for blocking the return of some blocks to the parallel position if the input voltage $V_{in}$ is less than the desired voltage. The desired voltage is typically close to the voltage at which the source supplies its maximum power. For many generators, this is simply the no-load voltage of the generator divided by 2 (impedance matching). For others, such as for photovoltaic cells whose output impedance is non-linear, the basis may be either a pre-recorded characteristic or a mechanism for searching for the optimum operating point of MPPT type (MPPT: maximum power point tracking).

According to variants of the invention, the return of some blocks to the parallel position is conditional upon an algorithm for searching for the maximum energy extraction from the energy source positioned on the input $V_{in}$ (MPPT: maximum power point tracking).

According to variants of the invention, the device includes means for keeping at least one of the blocks in series mode.

According to variants of the invention, the storage units are microbatteries.

According to variants of the invention, the storage units are microbatteries whose insertion electrodes may be chosen from among: Si, Ge, Sn, Bi, Sb and alloys formed of said elements, $LiCoO2$, $LiTiOS$, $V2O5$, and whose electrolyte may be chosen from among the following materials: LiPON (lithium phosphorus oxynitride), LiPOx (lithium orthophosphate), LLTO (lithium lanthanum titanate), LATP (lithium aluminum titanium phosphate), LiSP (lithium sulfur phosphide), LiSON (lithium sulfur oxynitride), LiBON (lithium boron oxynitride), LiLaZrO (lithium lanthanum zirconium oxide).

The microbatteries may include at least two electrodes of the same composition and of the same thickness, for example a substrate/Ti/SiLix/LiPON/SiLix microbattery.

BRIEF DESCRIPTION OF THE DRAWINGS

The invention will be better understood and other advantages will become apparent on reading the following description, which is given by way of nonlimiting example, and by virtue of the appended figures in which.

DETAILED DESCRIPTION

Generally speaking, the device of the present invention includes at least one block including an input port for collecting energy and an output port for supplying energy.

Simultaneous energy collection and energy supply operation is possible via the use of a sufficient number of blocks (some blocks being in energy collection mode while other blocks deliver their energy to the output).

According to the invention, a block includes n energy storage units, where n is an integer greater than or equal to 2. The energy storage units may be batteries, capacitors or supercapacitors. The energy storage systems are preferably completely solid batteries, and more particularly microbatteries.

The number n is an integer that is close, in terms of its upper value, to the ratio of the targeted nominal output voltage to the voltage of a charged energy storage unit.

Each energy storage unit may be at least associated with three transistors (except for possibly the first one and the last one), two for charge management (placed in parallel: parallel mode) and the other one for discharge management (placed in series: series mode).

Figure 2:
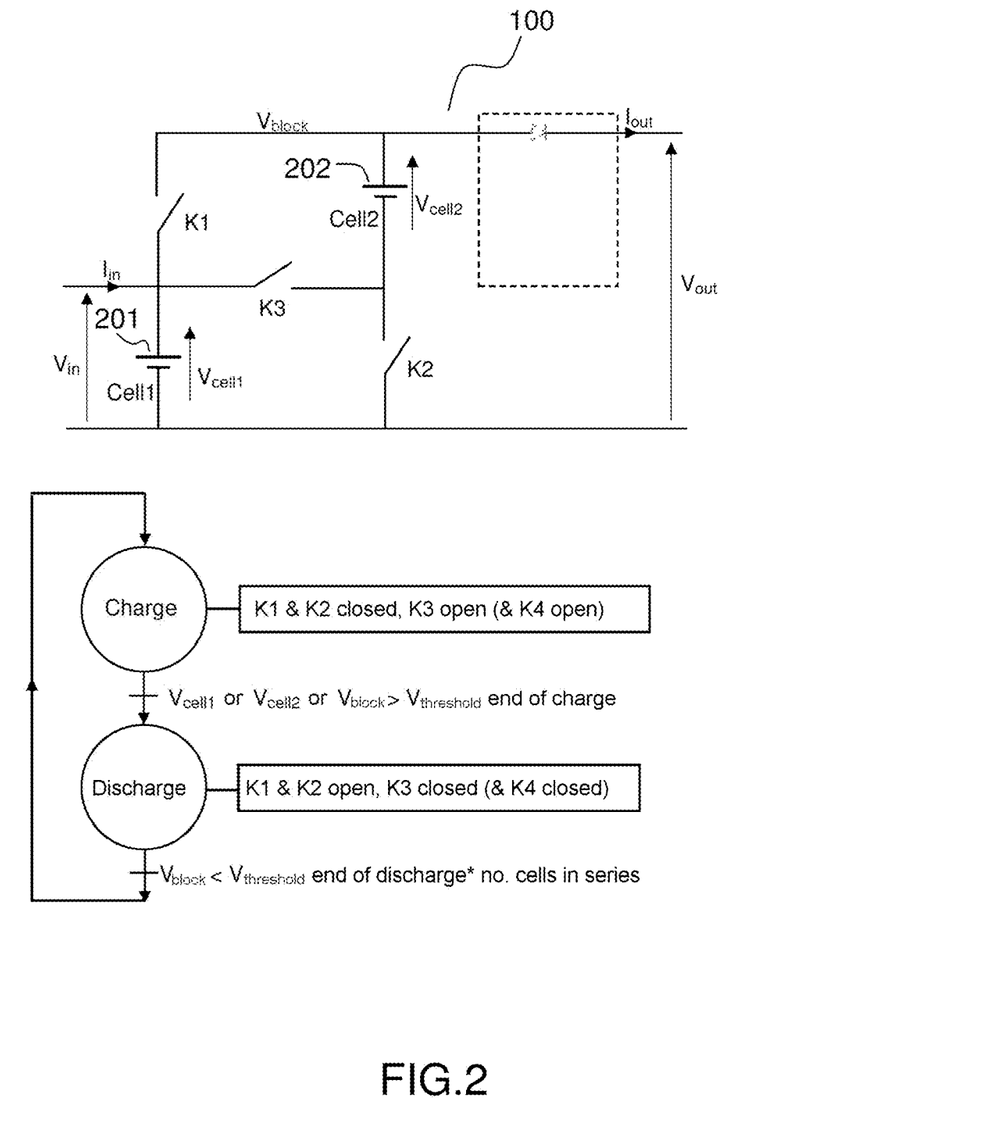
FIG. 2 outlines a block including two storage units used in a device of the invention.

FIG. 2 outlines one example of a block with a minimum number of energy storage units. A block 100 comprises a first storage unit 201 and a second energy storage unit 202. The first energy storage unit is connected to an input voltage $V_{IN}$.

A first switch K1 links the high potential of the first energy storage unit to the high potential of the second energy storage unit.

A second switch K2 links the low potential of the second energy storage unit to the low potential of the first energy storage unit.

A third switch K3 links the high potential of the first energy storage unit to the low potential of the second energy storage unit, allowing the two energy storage units to be placed in series.

Charging is performed with the energy storage units, forming the block, placed in parallel, the positive and negative electrodes of the various energy storage units being connected respectively to the positive and negative polarity of the input port.

An optional additional component K4 (shown in light gray and in dashed form) may be provided. This component K4 makes it possible to avoid a return of current from $V_{OUT}$ to the cells when said cells are in parallel.

It should be noted that, in the case of a device including several blocks that are connected to a common input voltage and to a common output voltage, a component K4 for avoiding a return of current is necessary on the blocks operating in recharge mode if other blocks maintain the voltage $V_{OUT}$ (discharge mode). The component K4 may be a diode, a voltage regulator (one-way current) or a commanded switch.

In charge phase (parallel mode), the switches K1 and K2 are closed, and the switch K3 is open (K4 is open).

After the end of the charge phase, the voltage $V_{cell1}$ of the first storage unit or the voltage $V_{cell2}$ of the second storage unit or the voltage $V_{Block}$ are higher than the target end of charge threshold voltage.

In discharge phase (series mode), the switches K1 and K2 are open, and the switch K3 is closed (K4 is closed).

After the end of the discharge phase, the voltage $V_{block}$ is less than the end of discharge voltage $V_{threshold}$ (for each of the storage units)×number of energy storage units placed in series.

Generally speaking and according to the invention, following toggling from one mode to the other (charge/discharge), a waiting period before the evaluation of the new transition condition may be applied. This period makes it possible to wait for the new configuration to be correctly established (that is to say for example for the switches to have correctly finished opening or closing, or else for the storage units to have been able to correctly balance their voltage after being placed in parallel).

The end of charge management is performed by comparing the voltage, possibly the state of charge (SOC) of the storage units of the block with a reference value.

In practice, this may in most cases involve comparing the voltage of the storage units with a reference voltage.

For the sake of simplicity, this end of charge detection may be performed via a simple comparator, or the simple crossing of the control threshold voltage of a switch (the gate-source voltage of a MOS/FET/JFET etc. transistor, the base-emitter voltage of a bipolar transistor, the control voltage of a relay/microswitch, the control voltage of a GaN/SiC etc. transistor, normally on or off switch, with positive or negative commanding).

In the remainder of the description, the threshold end of charge voltage is denoted $V_{threshold1}$.

Discharging is performed by placing the storage units in series, and the positive terminal of the storage unit n−1 is connected to the negative terminal of the storage unit n. The positive terminal of the last storage unit of the block is connected to the positive terminal of the output port (energy supply).

The end of discharge is performed by comparing the sum of the voltages or SoC of the storage units placed in series.

In practice, this will in most cases involve simply comparing the overall voltage of the n storage units placed in series with a reference voltage. For the sake of simplicity, this end of charge detection may be performed via a simple comparator, or the simple crossing of the control threshold voltage of a switch (the gate-source voltage of a MOS/FET/JFET etc. transistor, the base-emitter voltage of a bipolar transistor, the control voltage of a relay/microswitch, the control voltage of a GaN/SiC etc. transistor, normally on or off switch, with positive or negative commanding). This may involve a single threshold voltage or a combination of threshold voltages: several transistors (for example in a Darlington connection), an associated Zener diode in series with the commanding of a transistor, etc.

In the remainder of the description, the threshold end of discharge voltage is denoted $V_{threshold2}$.

The placement in series of the storage units is thus conditional upon the crossing of $V_{threshold1}$. The placement in parallel is conditional upon the crossing of $V_{threshold2}$ upon discharge.

By choosing $V_{threshold2} < n\ V_{threshold1}$, the assembly operates as a hysteresis oscillator with a parallel state that is shorter the higher the input power, and a series state that is shorter the higher the power required at output.

Figure 3:
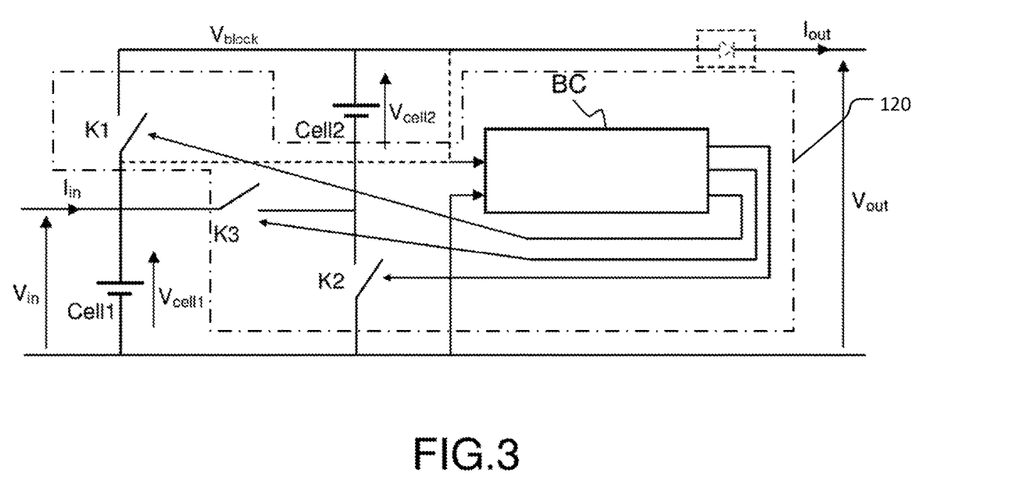
FIG. 3 illustrates the integration of a comparison block with hysteresis and commanding of switches within the block comprising two storage units illustrated in FIG. 2.

According to the present invention, the energy storage device comprises at least one comparator block BC as positioned as illustrated for example in FIG. 3 that may connected to and/or may be part of a charge and discharge management circuit 120. The operation of the comparator block with hysteresis and commanding of switches is described through FIGS. 4 and 5, which respectively illustrate the electrical characteristic of the comparison block with the mode versus the voltage $V_{Block}$ and the electrical characteristic of the comparison block with the mode versus the voltage $V_{cell1}$.

Figure 4:
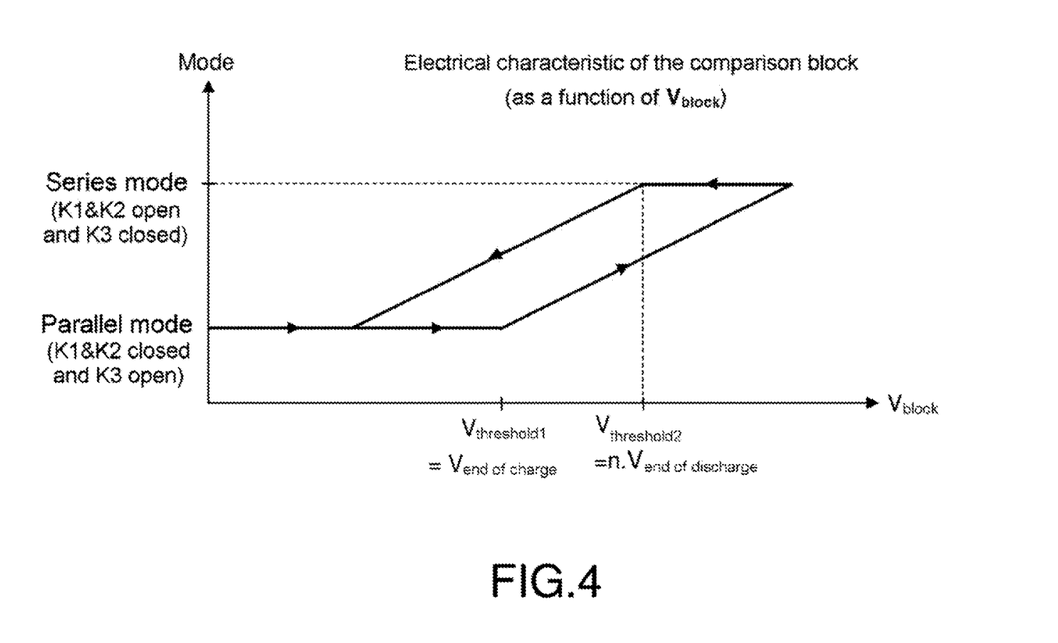
FIG. 4 illustrates the electrical characteristic of the comparison block as a function of the voltage $V_{Block}$.

As illustrated in FIG. 4, the voltage $V_{block}$ gradually increases in charge mode, with the switches K1 and K2 in the closed position and the switch K3 in the open position, this being for the parallel mode, and until the first threshold voltage $V_{threshold1} = V_{end\ of\ charge}$ is reached.

When the voltage $V_{Block}$ is sufficient, the series mode may be established, the switches K1 and K2 are in the open position and the switch K3 is in the closed position. The voltage $V_{block}$ changes almost instantaneously (the time for the switches to change state) from $V_{threshold1}$ to $n*V_{threshold1}$.

The voltage $V_{Block}$ then decreases until reaching the second threshold voltage $V_{threshold2} = n\ V_{end\ of\ discharge}$.

Figure 5:
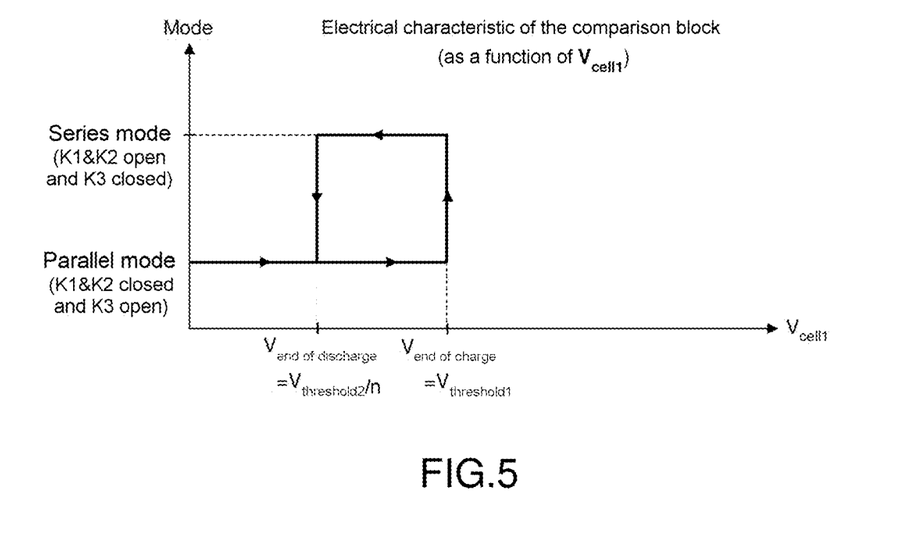
FIG. 5 illustrates the electrical characteristic of the comparison block as a function of the voltage $V_{cell1}$.

With regard to the evolution of the mode with the voltage across the terminals of the cell $V_{cell1}$, FIG. 5 highlights the hysteresis cycle, the voltage $V_{end\ of\ discharge} = V_{threshold2}/n$.

Figure 6:
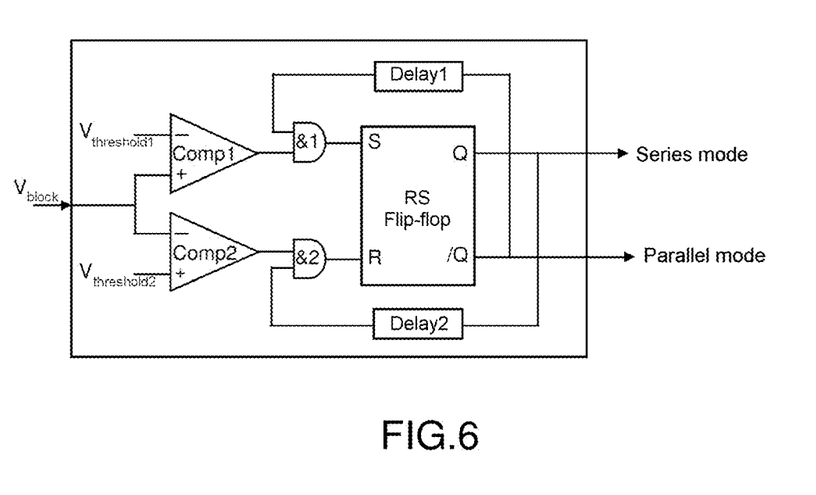
FIG. 6 illustrates an exemplary embodiment of a comparison block connected to the voltage $V_{block}$.

FIG. 6 illustrates one exemplary embodiment of a comparison block connected to $V_{Block}$, the operation of which is explained below:

Starting from an initial state in parallel mode: Q=0, /Q=1, $V_{Block}$ is less than $V_{threshold1}$ and $V_{Block}$ is less than $V_{threshold2}$.

The voltage $V_{Block}$ increases gradually via the input current $I_{in}$ until reaching the threshold voltage $V_{threshold1}$. The output of the comparator Comp1 then toggles from 0 to 1. With the output/Q being at 1, the output of the AND gate "&1" then also toggles to 1, thereby activating the SET input "S" of the RS flip-flop, thereby changing the output Q to the state 1 and the output/Q to the state 0. The series mode is then activated.

The gate &1 makes it possible to consider the result of the comparison of Comp1 only if the current mode is the parallel mode. Advantageously, a delay "Delay1" makes it possible to validate the result of the comparison only if the parallel mode is correctly established (present since a minimum time).

The voltage $V_{Block}$ then decreases gradually via the output current $I_{out}$ until reaching the voltage $V_{threshold2}$. The output of the comparator Comp2 then toggles from 0 to 1. With the output Q being at 1, the output of the AND gate "&2" then also toggles to 1, thereby activating the RESET input "RS" of the RS flip-flop, thereby changing the output Q to the state 0 and the output/Q to the state 1. Parallel mode is then activated.

The gate &2 makes it possible to consider the result of the comparison of Comp2 only if the current mode is the series mode. Advantageously, a delay "Delay2" makes it possible to validate the result of the comparison only if the series mode is correctly established (present since a minimum time).

Figure 7:
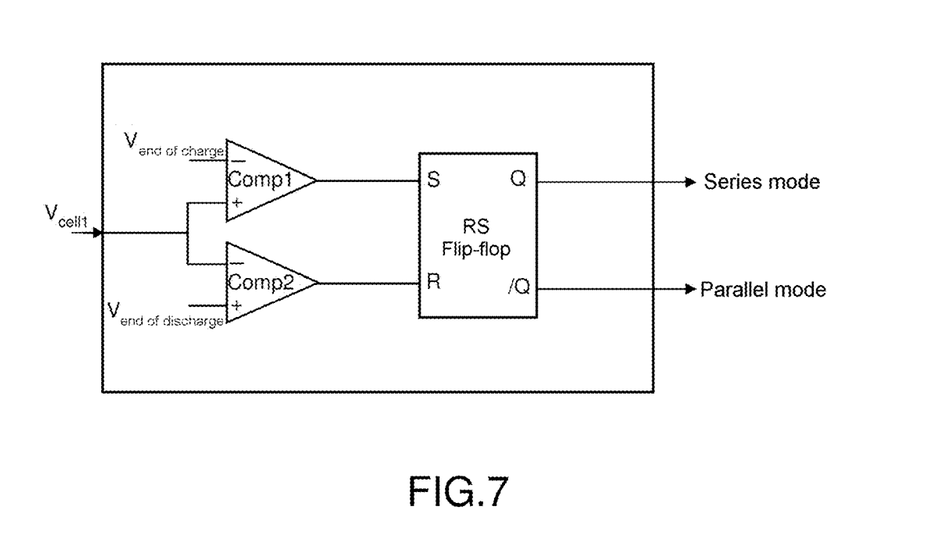
FIG. 7 illustrates an exemplary embodiment of a comparison block connected to the voltage $V_{cell1}$.

FIG. 7 illustrates one exemplary embodiment of a comparison block connected to the voltage $V_{Cell1}$, the operation of which is explained below:

As the voltage $V_{end\ of\ discharge} = V_{threshold2}/n$ is always less than the voltage $V_{end\ of\ charge} = V_{threshold1}$, it is not necessary to be able to inhibit the outputs of the comparators using AND gates depending on the current state. Specifically, the voltage $V_{cell1}$ is not impacted by the parallel/series toggling operations, in contrast to $V_{block}$ which, at each toggling operation, is multiplied or divided by n.

Figure 8:
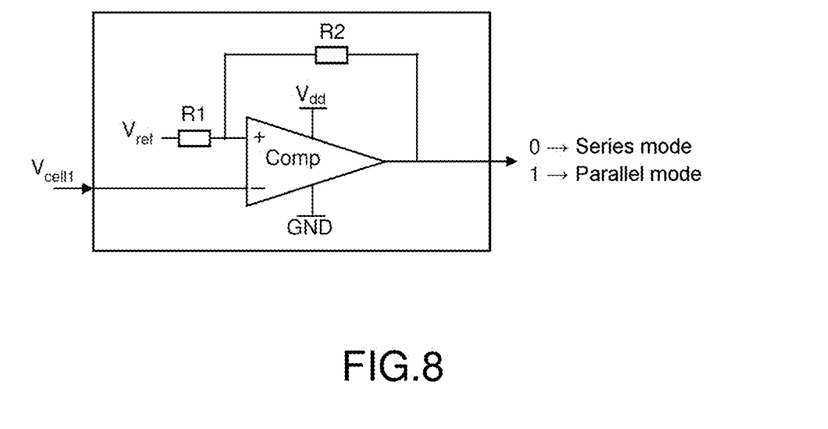
FIG. 8 illustrates an exemplary embodiment of a comparison block connected to the voltage $V_{cell1}$.

In practice, on the basis of $V_{cell1}$, a simple hysteresis comparator may suffice. FIG. 8 illustrates a second exemplary embodiment of a comparison block connected to the voltage $V_{cell1}$, the operation of which is explained below:

In this assembly, the end of charge and end of discharge voltages are defined as follows:

$$V_{end\ of\ charge} = \frac{R2 \cdot V_{ref} + R1 \cdot V_{dd}}{R1 + R2}$$

$$V_{end\ of\ discharge} = \frac{R2}{R1 + R2} V_{ref}$$

Possibly, a switch (diode or transistor) may be placed at the input of each block in order to manage the charging of the block. A diode, for example, guarantees that a current does not return from the storage elements to the source when the source is not producing. A commandable switch may make it possible, inter alia:

to regulate the input voltage: depending on the number of blocks connected to the source, it is possible to draw more or less therefrom and to make its voltage drop more or less. This mechanism may be used to make the source operate at its optimum operating point of MPPT type (maximum power point tracking, used notably in photovoltaic recovery); to speed up the recharging of blocks in particular: for example to make them available to the output as quickly as possible;

to limit the current drawn from the source.

Advantageously, the energy storage units may be microbatteries that have the same capacity and the same operating voltage due to their design/manufacture.

They may be characterized by:

low-potential operation, advantageously between 0 and 2 V, and more advantageously between 0 and 0.5 V. This characteristic ensures that the microbatteries are charged directly by a wide range of ambient energy sources. Specifically, as the microbatteries are charged in parallel, if the voltage at the input (energy source) is greater than or equal to 0.5 V, all of the available microbatteries are able to be charged without resorting to voltage-matching circuits (for example, for conventional batteries operating between 3 and 4 V, it is necessary to have a step-up voltage circuit in order to charge them if the source voltage is 0.5 V, this having the effect of reducing the overall efficiency);

a high storage capacity in comparison with simple electrical capacitors, advantageously greater than 0.1 mAh, and more advantageously greater than 1 mAh, thereby making it possible to have a useful amount of energy (a few mWh), sufficient for a number p of autonomous components;

a low internal resistance, advantageously less than 100 ohms, more advantageously less than 10 ohms, allowing charging/discharging at useful current densities (a few mA), sufficient for a number of p autonomous components.

The microbatteries may for example be symmetrical, that is to say that they have a particular architecture with the positive and negative electrodes formed of the same material, the metal ions traveling back and forth from one of the two electrodes to the other through the solid electrolyte separating them. In the case of this configuration, the microbattery operates within a potential window centered on 0 V, for example between −1 V and 1 V, thereby making it possible to dispense with a protection circuit (crossing to 0 V critical for conventional batteries, possibility of charging with a potential greater than the limit voltage without degradation).

Figure 9:
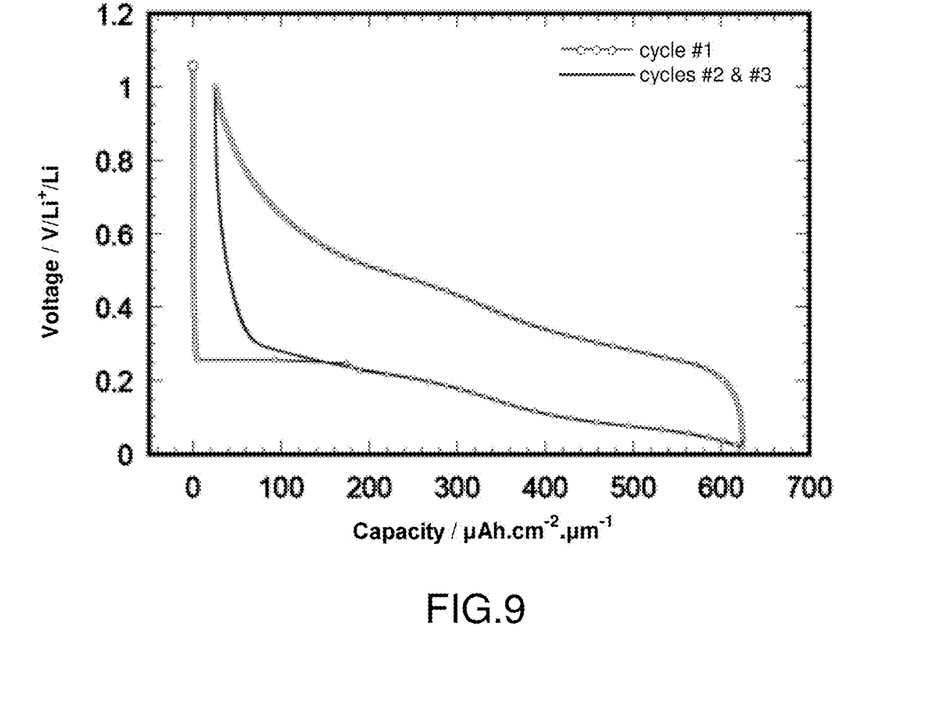
FIG. 9 illustrates the curve of the evolution of the voltage as a function of the capacity across the terminals of an Si/LiPON/Li microbattery during galvanostatic cycling used in a block of a device of the invention.

A first example of an architecture of a microbattery used in a device of the present invention may be formed with a substrate/Ti/Si/LiPON/Li stack. FIG. 9 illustrates the curve of the evolution of the voltage as a function of the capacity across the terminals of an Si/LiPON/Li microbattery during galvanostatic cycling.

A second example of an architecture of an energy storage unit of microbattery type may be formed with a substrate/Ti/SiLix/LiPON/SiLix stack. In this configuration, the microbattery is symmetrical and allows operation at a potential centered around 0 V, with the advantages cited above.

Other materials may be considered for the insertion electrode, and mention may be made for example of: Ge, Sn, Bi, Sb and alloys formed of at least two of said elements.

Other materials may also be considered for the solid electrolyte, for example LLTO, LATP, LiSP, LiSON, LiBON, LiLaZrO.

Figure 10:
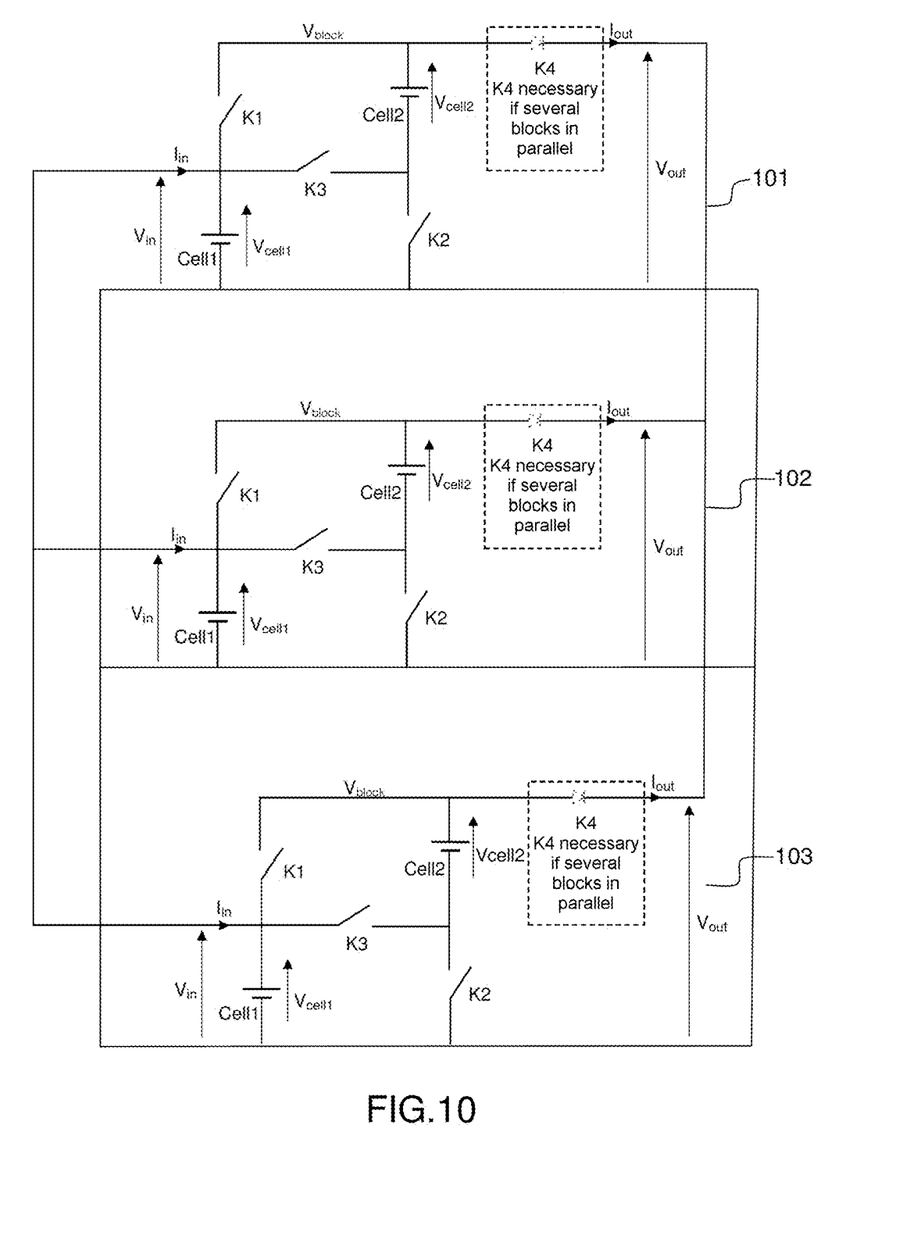
FIG. 10 outlines a configuration of a device of the invention comprising 3 blocks linked to one and the same input voltage and to one and the same output voltage.

Device Comprising a Set of Blocks:

To ensure continuous and simultaneous charging and discharging operation, the device of the invention may advantageously comprise a minimum of 3 blocks: 1 that recharges via the input, 1 that discharges on the output and 1 third one that is liable to currently be changing from one mode to the other, and therefore to be temporarily unavailable. FIG. 10 outlines such a configuration showing a block 101, a block 102 and a block 103 having the same input voltage $V_{IN}$ and the same output voltage $V_{out}$.

In one simplified case, the operation of the blocks may be completely independent. Each one toggles asynchronously between its series mode and its parallel mode depending on its hysteresis, its recharge current and its discharge current.

In a first improved mode, out of the blocks that are in parallel mode (awaiting recharging), only some of them, via electrically driveable switches, are connected to the input source so as to optimize the voltage and/or the current extracted from this source. In the case of a generator of energy recuperator type, the number of blocks in parallel mode (awaiting recharging) connected to a generator is ideally optimized in real time so as to maximize the power supplied by the generator ("MPPT" for "maximum power point", making it possible to track the maximum power point of a nonlinear electrical generator), in one simplified mode, the system may simply target a voltage or a predefined input current.

In one variant, instead of the blocks in parallel mode (awaiting recharging) being completely connected or completely disconnected to or from the generator, the system may ensure driving of connection switches of the various blocks, for example transistors in linear mode, so as to more or less limit the recharge current for each of the blocks and thus control the current extracted from the generator.

In another variant in which the generator placed at the input has a current capacity far higher than necessary for supplying power to the device, the recharge current for the blocks may be regulated/limited, via switches in linear mode or current limiters, so as not to inject too large a current into the energy storage units, for example microbatteries, which could significantly reduce their lifetime.

In an optimized mode and in the event of an overcapacity of the source to supply a high power, the recharge current is adjusted in real time so as just to meet the requirements of the application, so as to ensure that a minimum number of blocks are charged and available to supply power to the output.

Example of a Block Used in a Device of the Invention.

Figure 11:
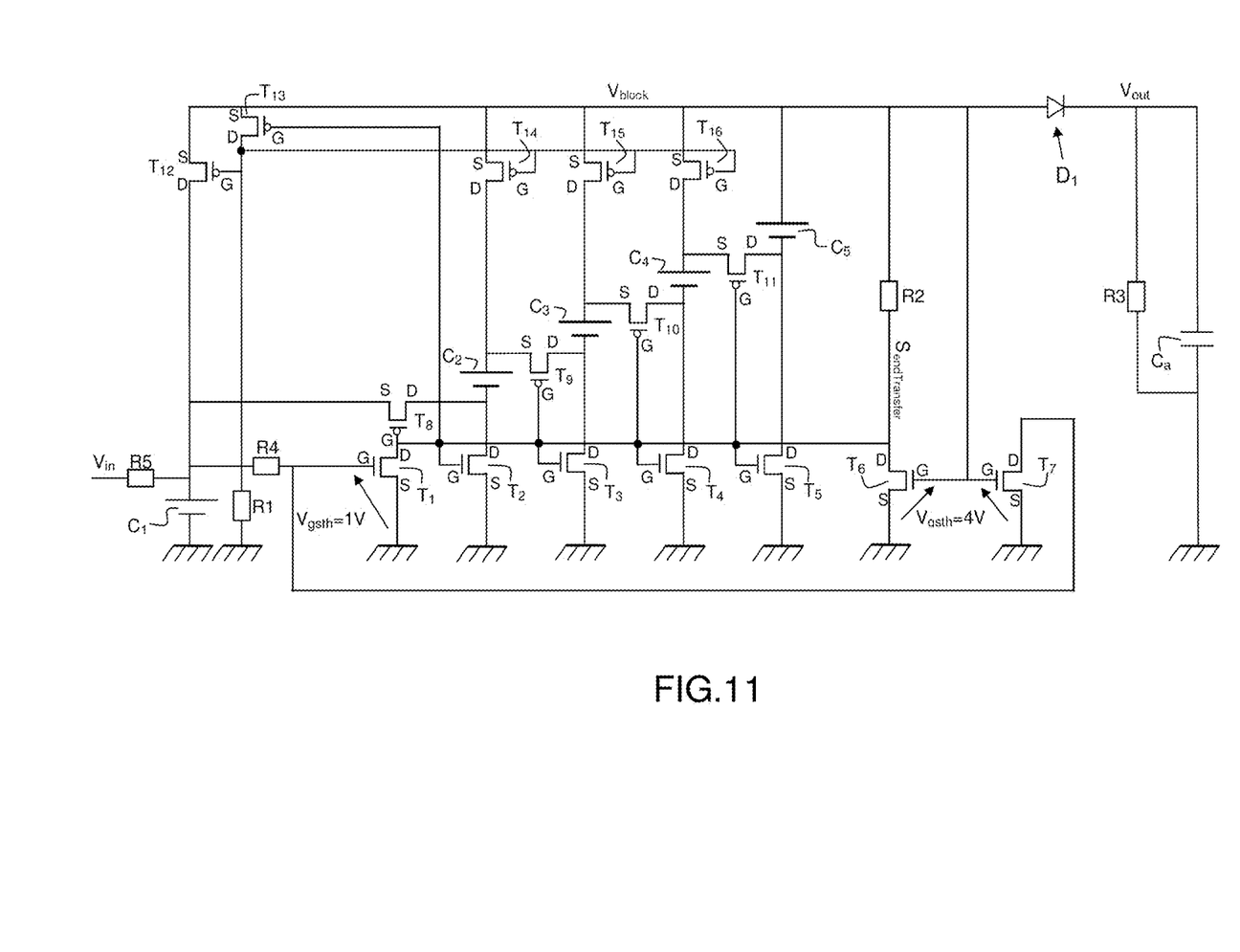
FIG. 11 illustrates an example of a block used in a device of the invention comprising a set of 5 storage units and a set of transistors, making it possible to reversibly ensure the change from parallel mode to series mode.

According to this example, the proposed block comprises, as illustrated in FIG. 11:

a set of 5 storage units, called batteries below, referenced: C1, C2, C3, C4 and C5;

a set of transistors (represented by a gate G, drain D and source S scheme): T1, T2, T3, T4, T5, T6, T7, T8, T9, T10, T11, T12, T13, T14, T15, T16;

a diode or current regulator D1;

resistors R1, R2, R3, R4 and R5.

When the batteries are discharged, the transistors T1, T6 and T7 are open, and the return resistors place the batteries in a parallel configuration.

When the voltage of the batteries reaches 1 V, the transistor T1 closes (threshold voltage Vgsth=1 V), thereby placing the batteries in a series position. With each battery having been charged to 1 V, placing them in series leads to the voltage $V_{block}$ (at the output of the set of batteries placed in series) reaching approximately 5*1 V=5 V.

The batteries then discharge to $V_{out}$ via the output diode D1, or advantageously via a regulator that makes it possible to stabilize the output voltage while at the same time ensuring, for some types of regulator, that a return current is blocked in the same way as the diode. Such a diode or such a regulator is placed at the output of each of the blocks if several blocks are used.

For as long as the voltage $V_{block}$ remains higher than 4 V, the transistors T6 and T7 remain closed and the series mode is maintained (threshold voltage Vgsth=4 V).

When the voltage $V_{block}$ drops below 4 V, the transistors T6 and T7 open.

The voltage of the batteries has dropped to 4 V/5=0.8 V, this meaning that the transistor T1 has also opened.

The signal $S_{endTransfer}$ rises to the potential $V_{block}$ and leads to the batteries being placed in parallel.

In practice, during the series mode, as the first storage element is connected to the source, said first storage element is able to continue to charge (more than what it discharges) and keep the transistor T1 closed.

During the series mode, this does not pose a problem, but returning to parallel mode becomes impossible, as the transistor T1 does not open, the signal $S_{endTransfer}$ is unable to rise and close the transistors for placement in parallel.

It is for this reason that a transistor T7 is advantageously provided, making it possible to overcome this problem by forcing the transistor T1 to open during the series mode and slightly beyond via the time constant R4*$C_{T1}$, where $C_{T1}$ is the input capacitance of the transistor T1 (gate-source capacitance of the MOS transistor).

The parallel mode is thus able to be established, at least temporarily, when the transistor T6 and the transistor T7 have just opened (the transistor T6 and the transistor T7 are identical in the example).

This temporary placement in parallel is enough to balance the voltages of the storage elements and to authorize the placement in series only when all of the storage elements of the block exceed 1 V. The placement in parallel is then maintained until the voltage of the batteries rises to 1 V and a new cycle restarts, and so on.

In this example, the voltages $V_{threshold1}$ and $V_{threshold2}$ are produced respectively by the transistors T1 and T6 (with the transistor T7 identical to the transistor T6). It is also possible to use a comparator associated with a voltage reference to perform this function. The toggle threshold may then be more accurate and the comparison may be faster; however, for consumption and cost considerations, the use of a single transistor may be advantageous if the accuracy and toggle speed constraints are relatively relaxed (>100 mV and >100 µs).

Typically, all of the transistors other than T1, T6 and T7 may have a threshold voltage Vgsth preferably less than 0.5 V.

One Example of the Operation of the Assembly is Described Below:

The input voltage $V_{in}$ is connected to a 2 V voltage source followed by a 10 kΩ resistor.

In this example, the thresholds are 2 V for the transistor T1 and 4.95 V for the transistors T6 and T7. The other transistors switch at 1 V.

At startup, all of the storage units C1, C2, C3, C4 and C5 are discharged.

When the input voltage $V_{in}$ begins to rise, it recharges, through its output impedance R5, the first capacitor C1.

When the voltage across the terminals of the first capacitor reaches 1 V, the transistors for placement in parallel: T2, T3, T4, T5, T12, T14, T15, T16 begin to close. The capacitors are therefore gradually placed in parallel (the transistors change gradually from resistive to completely in the on state). During this phase of voltage balancing between the 5 storage elements, the voltage of the first cell remains substantially constant around 1 V, which voltage is found in $V_{block}$.

Once all of the transistors for placement in parallel are correctly closed, the assembly voltage $V_{block}$ starts to rise again via the recharging, by the source, of all of the capacitors placed in parallel.

When the voltage of the first cell (and therefore also of the other cells placed in parallel) approaches 1.6 V, the transistors T1 and T13 close, T13 carrying forward the result of the comparison of the voltages so that the transistor T1 commands the other transistors, thereby leading to the opening of the transistors T14, T15, T16, T2, T3, T4, T5, T12 for placement in parallel and to the closure of the transistors T8, T9, T10, T11 for placement in series.

The capacitors are then in series and deliver their energy to the output $V_{out}$ via the diode D1. When placed in series, the voltage reaches 8 V, that is to say 5*1.6 V, and then decreases gradually with the consumption of the load placed at output.

The transistor T6 makes it possible to lock the series mode, even if T1 opens following discharging of C1.

When $V_{block}$ reaches 5.2 V, the transistors T6 and T7 open. Via R4 and the input capacitance of T1, the transistor T1 remains forced to open a short time interval. (It should be noted that a physical capacitor could possibly supplement the input capacitance of T1.) During this short time interval, the resistor R2 controls the placement in parallel, and therefore the placement at equipotential, of the storage elements.

Once the time interval has elapsed, the transistor T1 is again driven by the voltage of the battery cell C1, and finally by the voltage of all of the capacitors placed in parallel.

When placed in parallel, the voltage $V_{block}$ has a value of approximately 5.2 V/5=1.04 V.

The capacitors recharge through $V_{in}$ via its output impedance R5.

When the voltage of the capacitors reaches 1.6 V, the system toggles back to series mode and a new cycle restarts.

The operation is completely autonomous, and does not require any external voltage source to supply power to an automatic control machine and to command the transistors.

There is no time base that clocks a switching frequency. Toggling from one mode to the other is completely asynchronous, and is defined via state of charge levels of the storage elements and not with respect to an output voltage regulation.

The charge speed depends on the capability of the source to rapidly recharge the storage elements from a first level to a second level, and the discharge speed depends on the current drawn by the application in order to change from the second level of charge to the first level of charge.

In series with the resistor R5, it is possible to have a one-way current component, such as a diode or a current limiter. The current limiter may notably serve to protect the storage elements in the event of current peaks from the source. The one-way current aspect may make it possible to avoid the energy storage elements discharging into the source when said source is not supplying energy, or even, if several blocks are placed in parallel, to avoid one of the blocks discharging into a discharged block.

Figure 12:
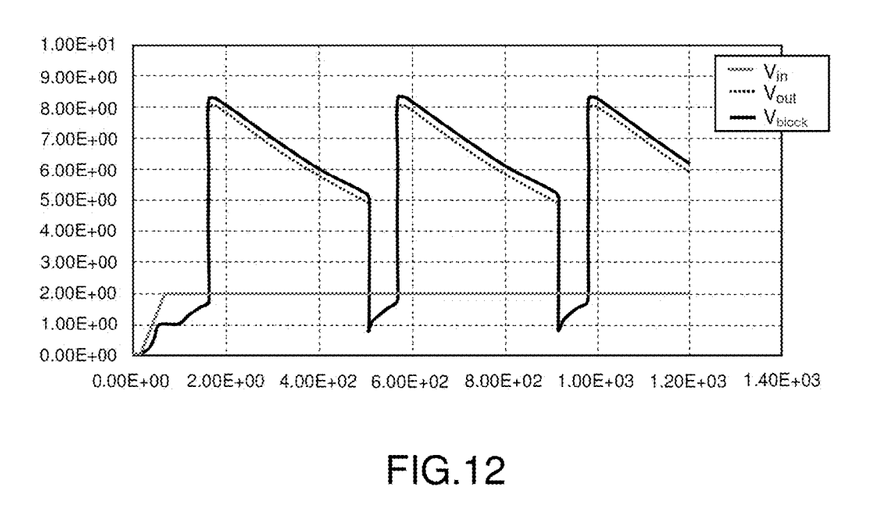
FIG. 12 illustrates the evolution of the voltages $V_{IN}$, $V_{block}$, $V_{OUT}$ as a function of time with an example of a device such as the one illustrated in FIG. 10.

FIG. 12 illustrates the timing diagram for the input voltage $V_{IN}$, output voltage $V_{OUT}$ and voltage of the block $V_{Block}$, giving the voltages in volts as a function of time (expressed in seconds), for the example of a block illustrated in FIG. 5 and obtained through SPICE (simulation program with integrated circuit emphasis) simulation, which is general analog electronic circuit simulation software containing examples of components on the market.

The components on the market that are used for the simulation are as follows:
- the transistor T1: a BUK9219-55A component;
- the transistors T2, T3, T4, T5: IRLM6244 components;
- the transistors T6, T7: IPB011N04N components;
- the transistors T8, T9, T10, T11, T12, T13, T14, T15, T16: Si4913DY components;
- the diode D1: a 1N4148 component;
- the resistors R1, R2, R4 have values of 10 MΩ;
- the resistor R3 has a value of 5 MΩ;
- the resistor R5 has a value of 10 kΩ.

The capacitances of the elements C1, C2, C3, C4, C5 have values of 1 mF. The capacitance Ca has a value of 10 µF.

According to variants of the invention, the first storage unit of the block may have a capacitance greater than the other storage elements, such that it is able to store all of the power coming from the source when the block is in series and/or parallel mode, or even be a hybridization of several storage technologies (battery/capacitor/supercapacitor, etc.).

Each storage unit may itself be formed of several elementary storage units.

Figure 13:
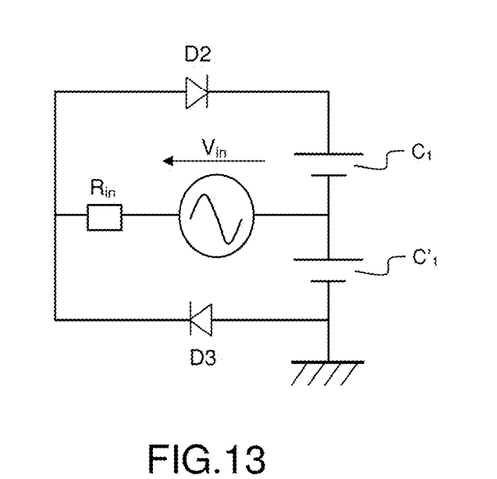
FIG. 13 illustrates an example of a storage unit including two elementary storage units including a center tap, able to be used in a variant of the device of the invention.

The first storage unit may also for example feature a center tap for facilitating the collection of energy from an energy source whose potential evolves alternately, as described in FIG. 13, which shows a storage unit formed of two elementary storage units C1 and C1' and featuring a center tap for the input.

The storage device of the present invention may be particularly beneficial for low-voltage energy recovery systems: photovoltaic, thermoelectric, fuel cell, biocell, electromagnetic, etc., for communicating sensors and roaming objects.

With regard to a communicating sensor, this may for example be a temperature, pressure, humidity or acceleration sensor that periodically performs measurements and wirelessly transmits its information to a receiver (display, Internet box, cloud via for example a Sigfox or Lora network, etc.).

With regard to a roaming object, this is more an object that is transported, that does not remain still, a connected watch, cardiometers, perspiration sensors, pacemakers, etc.

The invention claimed is:

1. An energy storage device comprising at least one block, said block being connected to an input voltage $V_{in}$ and delivering a voltage $V_{out}$ greater than $V_{in}$ and including:
   n energy storage units, where n≥2;
   a charge and discharge management circuit electrically linked to the n energy storage units and making it possible to alternately connect all of the energy storage units of one and a same block to one another, in parallel mode or in series mode;
   the energy storage units respectively having an end of charge voltage $V_{end\ of\ charge}$ and an end of discharge voltage $V_{end\ of\ discharge}$;
   said block having a defined block voltage $V_{Block}$ between a low potential of a first energy storage unit and a high potential of an nth energy storage unit, wherein said charge and discharge management circuit includes:
   first means for triggering a toggling from the parallel mode to the series mode, through the exceedance of a first threshold voltage ($V_{threshold1}$) in one of the energy storage units, said first threshold voltage corresponding to a target end of charge voltage of said storage unit;
   second means for triggering a toggling from the series mode to the parallel mode, by the voltage $V_{Block}$ crossing below a second threshold voltage ($V_{threshold2}$), said second threshold voltage corresponding to a voltage equal to a sum of the n end of discharge voltages of the n energy storage units; and
   said first means and said second means comprising a comparator block including at least one comparator electrically linked to the terminals of one of the storage units or to terminals of the block:
   a detection of the crossing by the first threshold voltage being performed by way of a reference voltage and of said comparator block, and
   a detection of the crossing by the second threshold voltage being performed by way of the reference voltage and of said comparator block.

2. The device as claimed in claim 1, wherein said comparator block includes two comparators.

3. The device as claimed in claim 1, furthermore including an electronically commandable switch electrically linked to the terminals of one of the storage units or to the terminals of the block in which the detection of the crossing by the first threshold voltage or by the second threshold voltage is performed by way of a toggle threshold voltage of said electronically commandable switch (transistor, relay, microswitch).

4. The device as claimed in claim 1, wherein said block including n storage units, where n is an integer greater than or equal to 2, a low potential of an ith storage unit (i ranging from 2 to n) is connected to the high potential of an (i−1)th storage unit by way of a first switch and to the low potential of the first storage unit by way of a second switch, and the high potential of the (i−1)th storage unit is connected to the high potential of the nth energy storage unit via a third switch.

5. The device as claimed in claim 4, wherein the second switch and the third switch are in an on state by default so as to allow the storage units to be placed in parallel utilizing transistors that are closed by default or of relays or microswitches that are closed when their control voltage is low or zero.

6. The device as claimed in claim 4, wherein the minimum control voltages of the second switch and the third switch are less than the first threshold voltage, advantageously at least 2 times less.

7. The device as claimed in claim 1, wherein the storage units are recharged through an input $V_{in}$ connected to the high potential of the first storage unit, either directly or by way of a one-way current component (diode, current limiter).

8. The device as claimed in claim 1, wherein the storage units are discharged substantially through an output $V_{out}$ connected to the high potential of the nth storage unit by way of a one-way current component that comprises at least one of the following: a diode or a matched voltage regulator.

9. The device as claimed in claim 1, wherein at least one block includes a one-way current component for avoiding a return of current $V_{out}$ to the storage units when these are in parallel mode.

10. The device as claimed in claim 1, further comprises several switchable blocks advantageously having the same input voltage $V_{in}$ and the same output voltage $V_{out}$.

11. The device as claimed in claim 10, further comprises at least three blocks, so as to have at least one block in charge mode, at least one block in discharge mode and at least one block in transition mode, in which the first means and the second means are currently toggling.

12. The device as claimed in claim 10, wherein at least one block includes a one-way current component, this block being in parallel charge mode, at least one other block connected in parallel maintaining an output voltage $V_{OUT}$ in discharge mode.

13. The device as claimed in claim 10, wherein a return of some blocks to the parallel position is conditional upon an algorithm for searching for a maximum energy extraction from an energy source positioned on an input $V_{in}$ (MPPT: maximum power point tracking).

14. The device as claimed in claim 10, further comprising means for keeping at least one of the blocks in series mode.

15. The device as claimed in claim 1, wherein the storage units are microbatteries.

16. The device as claimed in claim 1, wherein the storage units are microbatteries whose insertion electrodes may be chosen from among Si, Ge, Sn, Bi, Sb and alloys formed of said elements, LiCoO2, LiTiOS, V2O5, and whose electrolyte may be chosen from among the following materials: LiPON, LiPOx, LLTO, LATP, LiSP, LiSON, LiBON, LiLaZrO.

17. The device as claimed in claim 15, wherein the microbatteries include at least two electrodes of the same composition and of the same thickness, for example a substrate/Ti/SiLix/LiPON/SiLix microbattery.

* * * * *